US009936465B2

United States Patent
Kakishima et al.

(10) Patent No.: US 9,936,465 B2
(45) Date of Patent: Apr. 3, 2018

(54) USER TERMINAL AND RADIO COMMUNICATION METHOD

(71) Applicant: NTT DOCOMO, INC., Tokyo (JP)

(72) Inventors: Yuichi Kakishima, Tokyo (JP); Kazuki Takeda, Tokyo (JP); Tooru Uchino, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 17 days.

(21) Appl. No.: 15/024,883

(22) PCT Filed: Sep. 16, 2014

(86) PCT No.: PCT/JP2014/074415
§ 371 (c)(1),
(2) Date: Mar. 25, 2016

(87) PCT Pub. No.: WO2015/045960
PCT Pub. Date: Apr. 2, 2015

(65) Prior Publication Data
US 2016/0227492 A1 Aug. 4, 2016

(30) Foreign Application Priority Data
Sep. 26, 2013 (JP) ................................. 2013-200401

(51) Int. Cl.
*H04W 52/34* (2009.01)
*H04L 5/00* (2006.01)
(Continued)

(52) U.S. Cl.
CPC ........... *H04W 52/346* (2013.01); *H04L 5/001* (2013.01); *H04W 52/146* (2013.01);
(Continued)

(58) Field of Classification Search
CPC ...... H04L 5/001; H04L 5/0053; H04L 5/0007
See application file for complete search history.

(56) References Cited

U.S. PATENT DOCUMENTS 8,457,056 B2   6/2013  Zhang et al.
8,681,728 B2 * 3/2014  Jung .................... H04L 1/1893
                                                    370/329
(Continued)

FOREIGN PATENT DOCUMENTS

JP   2012517743 A   8/2012
WO  2012060067 A1   5/2012

OTHER PUBLICATIONS

Office Action issued in corresponding Japanese Application No. 2013-200401, dated Apr. 19, 2016 (5 pages).
(Continued)

*Primary Examiner* — Chandrahas B Patel
(74) *Attorney, Agent, or Firm* — Osha Liang LLP

(57) ABSTRACT

The present invention is designed to enable adequate transmission power control when inter-base station CA is employed. The present invention is designed so that, when inter-base station CA is employed and the transmission power of a user terminal reaches the maximum transmission power, the user terminal executes transmission power control by carrying out power scaling autonomously. For example, the user terminal has a transmission section that transmits an uplink physical channel in each component carrier, and a control section that switches, over time, the component carrier to which the uplink physical channel is transmitted preferentially.

9 Claims, 8 Drawing Sheets

(51) Int. Cl.
*H04W 72/02* (2009.01)
*H04W 72/08* (2009.01)
*H04W 52/14* (2009.01)
*H04W 52/28* (2009.01)

(52) U.S. Cl.
CPC ......... *H04W 72/02* (2013.01); *H04W 72/085* (2013.01); *H04W 52/281* (2013.01); *H04W 52/34* (2013.01)

(56) References Cited

U.S. PATENT DOCUMENTS

| | | |
|---|---|---|
| 2010/0246705 A1 | 9/2010 | Shin et al. |
| 2011/0141959 A1 | 6/2011 | Damnjanovic et al. |
| 2013/0176953 A1 | 7/2013 | Stern-Berkowitz et al. |
| 2013/0215811 A1 | 8/2013 | Takaoka et al. |

OTHER PUBLICATIONS

Extended European Search Report issued in the counterpart European Patent Application No. 14848841.4, dated Mar. 30, 2017 (12 pages).
Huawei, et al.; "Draft text proposal on physical layer support of dual connectivity"; 3GPP TSG RAN WG1 Meeting #74, R1-133918; Barcelona, Spain, Aug. 19-23, 2013 (5 pages).
Intel Corporation; "UL Control Enhancements for Small Cell Environments"; 3GPP TSG-RAN WG1 #74, R1-132937; Barcelona, Spain, Aug. 19-23, 2013 (4 pages).
3GPP TSG-RAN WG2 #79, "Introduction of 1CC transmission in a TTI for UL CA"; Agenda Item: 7.1.4; Aug. 13-17, 2012; Qingdao, China; R2-123997 (3 pages).
International Search Report issued in corresponding application No. PCT/JP2014/074415 dated Nov. 18, 2014 (2 pages).
Written Opinion of the International Searching Authority issued in corresponding application No. PCT/JP2014/074415 dated Nov. 18, 2014 (3 pages).
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).
Office Action issued in the counterpart Japanese Patent Application No. 2013-200401, dated Jul. 19, 2016 (4 pages).
Office Action issued in corresponding European Patent Application No. 14 848 841.4, dated Nov. 22, 2017 (6 pages).

\* cited by examiner

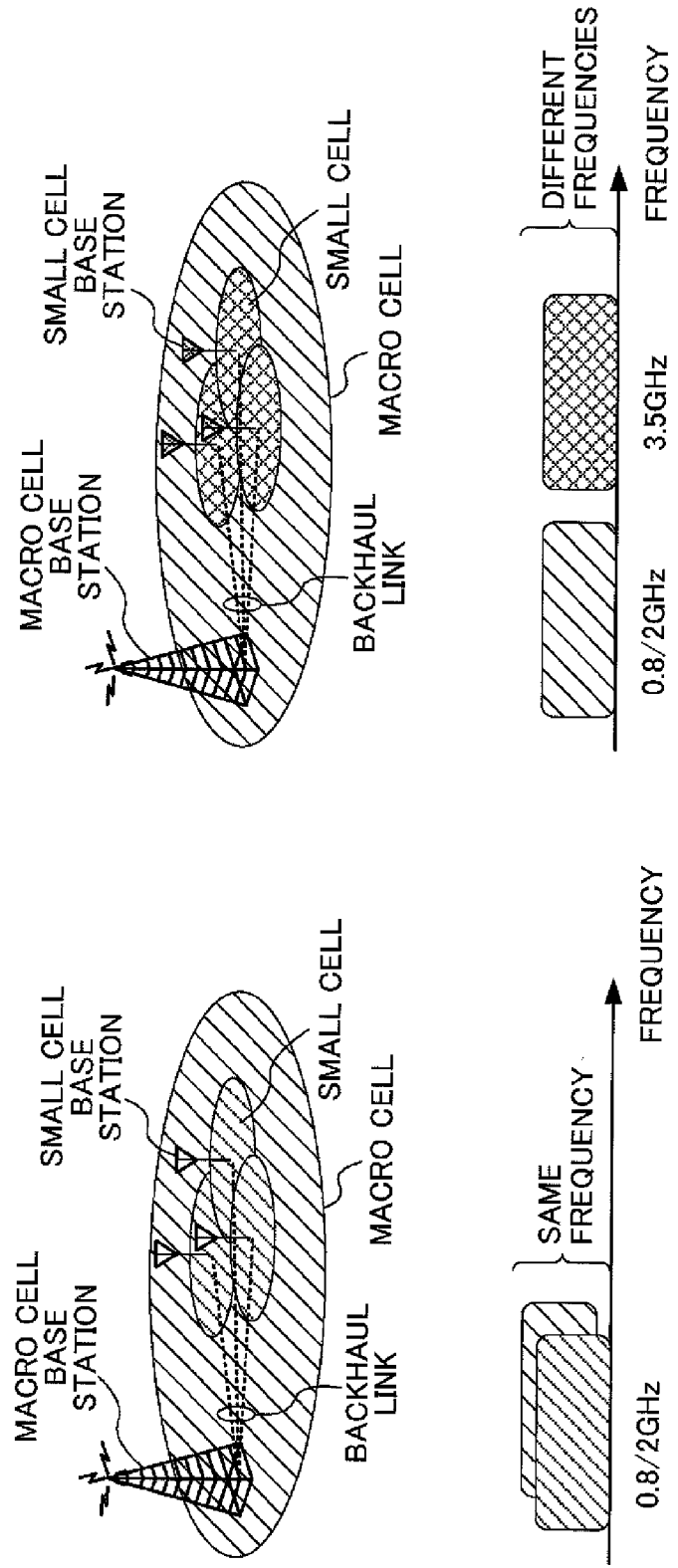

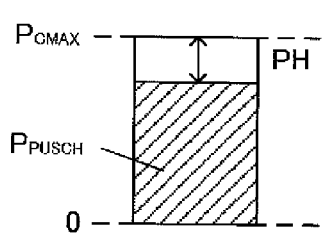
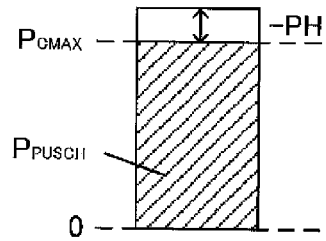
FIG.3A    FIG.3B
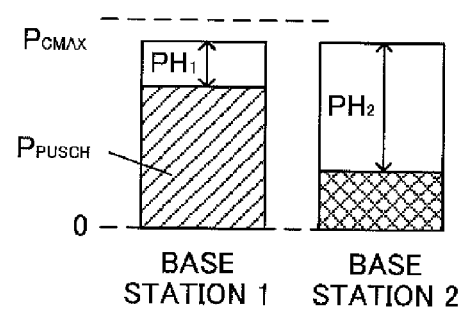
FIG.4
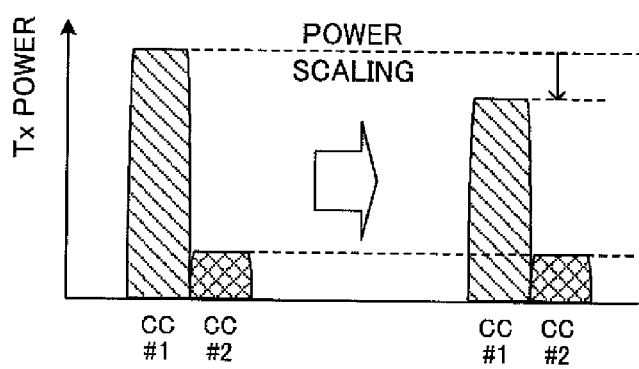
FIG.5

USER TERMINAL AND RADIO COMMUNICATION METHOD

TECHNICAL FIELD

The present invention relates to a user terminal and a radio communication method in a next-generation mobile communication system.

BACKGROUND ART

In LTE (Long Term Evolution) and successor systems of LTE (referred to as, for example, "LTE-advanced," "FRA (Future Radio Access)," "4G," etc.), a radio communication system (referred to as, for example, a "HetNet" (Heterogeneous Network)) to place small cells (including pico cells, femto cells and so on) having relatively small coverages of a radius of approximately several meters to several tens of meters, in a macro cell having a relatively large coverage of a radius of approximately several hundred meters to several kilometers, is under study (see, for example, non-patent literature 1).

For this radio communication system, a scenario to use the same frequency band in both the macro cell and the small cells (also referred to as, for example, "co-channel") and a scenario to use different frequency bands between the macro cell and the small cells (also referred to as, for example, "separate frequencies") are under study. To be more specific, the latter scenario is under study to use a relatively low frequency band (for example, 2 GHz) in the macro cell, and use a relatively high frequency band (for example, 3.5 GHz or 10 GHz) in the small cells.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

In LTE Rel. 10/11, coordinated multi-point transmission/reception (CoMP) technology and carrier aggregation (CA) technology are introduced.

Up to LTE Rel. 11, intra-base station CoMP/CA (intra-eNB CoMP/CA), which is premised upon controlling CoMP and CA by using one scheduler between multiple cells, is under study. In LTE Rel. 12, inter-base station CoMP/CA (inter-eNB CoMP/CA), which provides each of multiple cells with a separate scheduler and controls CoMP and CA on a per cell basis, is under study.

In inter-base station CoMP/CA, there is a possibility that a plurality of base stations allocate uplink transmission to one user terminal separately and simultaneously. In this case, there is a threat that the transmission power control value exceeds the upper limit due to resource allocation, propagation path fluctuations, closed-loop transmission power control, and so on.

The present invention has been made in view of the above, and it is therefore an object of the present invention to provide a user terminal and a radio communication method that enable adequate execution of transmission power control, especially when inter-base station CA is employed.

Solution to Problem

The user terminal of the present invention provides a user terminal that communicates by applying carrier aggregation, in which a plurality of radio base stations, connected via backhauls that produce delay that is not negligible, are each made a component carrier, and this user terminal has a transmission section that transmits an uplink physical channel in each component carrier, and a control section that switches, over time, the component carrier to which the uplink physical channel is transmitted preferentially.

Advantageous Effects of Invention

According to the present invention, it is possible to execute transmission power control adequately when inter-base station CA is employed.

BRIEF DESCRIPTION OF DRAWINGS

FIG. 1 provides conceptual diagrams of a HetNet;

FIG. 3 provides conceptual diagrams to explain the remaining transmission power PH of a user terminal;

FIG. 4 is a conceptual diagram to explain the remaining transmission power PH of a user terminal;

FIG. 5 is a diagram to explain an example of application of power scaling;

DESCRIPTION OF EMBODIMENTS

Now, an embodiment of the present invention will be described below in detail with reference to the accompanying drawings. FIG. 1 provides conceptual diagrams of a HetNet. FIG. 1A shows a case where the same frequency band is used between a macro cell and small cells. FIG. 1B shows a case where different frequency bands are used between a macro cell and small cells.

As shown in FIG. 1, a HetNet refers to a radio communication system in which a macro cell and small cells are placed to overlap each other geographically at least in part. Also, a HetNet is formed by including a radio base station that forms a macro cell (hereinafter referred to as a "macro cell base station"), a radio base station that forms a small cell (hereinafter referred to as a "small cell base station"), and a user terminal that communicates with the macro cell base station and the small cell base station.

In the case illustrated in FIG. 1A, it is possible to use, for example, carriers of the same frequency band such as 0.8

GHz (800 MHz) and 2 GHz in the macro cell and the small cells. In the case illustrated in FIG. 1B, for example, a carrier of a relatively low frequency band such as 0.8 GHz (800 MHz) and 2 GHz is used in the macro cell. Meanwhile, for example, a carrier of a relatively high frequency band such as 3.5 GHz is used in a plurality of small cells.

Also, when the small cells and the macro cell operate under different radio base stations, the macro cell base station and the small cell base stations are connected via backhauls and exchange information mutually. The connection between the macro cell base station and the small cell base stations may assume wire connection by means of optical fiber, non-optical fiber and so on, or may assume wireless connection. Note that, when the macro cell base station and the small cell base stations are connected via channels other than optical fiber, the delay time in the transmission/reception of information between the macro cell base station and the small cell base stations increases significantly. Ideally, the transmission delay of a backhaul is zero millisecond, but there is a possibility that the transmission delay becomes maximum several tens of milliseconds, depending on the environment of the backhaul.

Figure 2A:
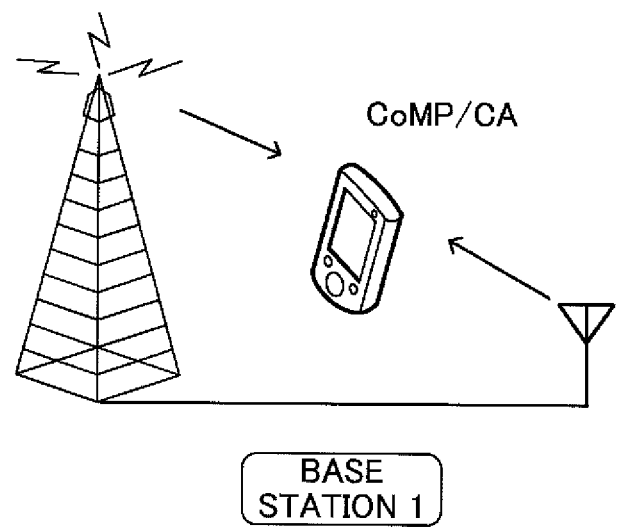
FIG. 2A is a conceptual diagram of intra-base station CoMP/CA.

FIG. 2A is a conceptual diagram of intra-base station CoMP/CA. Intra-base station CoMP/CA presumes that one base station (in FIG. 2A, the base station 1) controls the scheduling of two base stations.

Figure 2B:
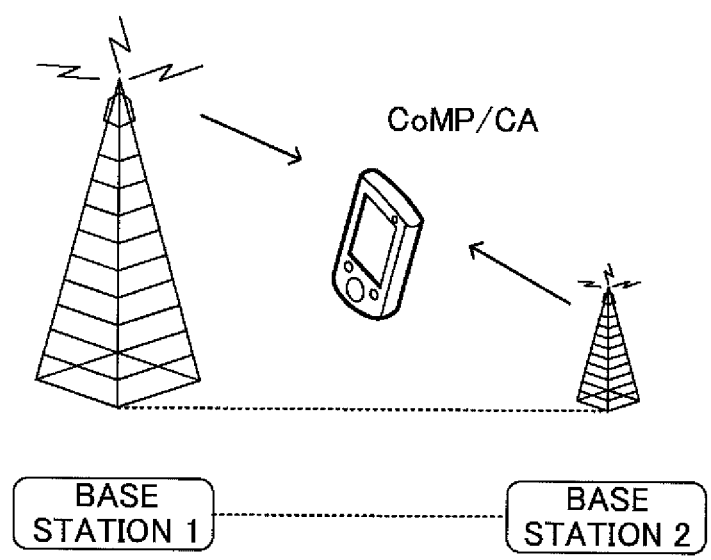
FIG. 2B is a conceptual diagram of inter-base station CoMP/CA.

FIG. 2B is a conceptual diagram of inter-base station CoMP/CA. Inter-base station CoMP/CA presumes that two base stations (in FIG. 2B, the base stations 1 and 2) control scheduling separately. The base station 1 and the base station 2 are connected via a backhaul (non-ideal backhaul), which produces delay that is not negligible, and exchange information with each other.

In the inter-base station CoMP/CA shown in FIG. 2B, there is only one user terminal for two base stations. Consequently, there is a possibility that two base stations transmit downlink signals to a user terminal separately and simultaneously.

Also, in inter-base station CoMP/CA, there is a possibility that two base stations allocate uplink signal transmission to a user terminal separately and simultaneously. In this case, there is a threat that the transmission power control value in the user terminal exceeds the upper limit due to the resource allocation, transmission path fluctuations, closed-loop transmission power control and so on. Meanwhile, if control is executed so that the transmission power of the user terminals does not run short, there is a threat that the resources to allocate will be insufficient.

The present invention will be described based on inter-base station CA. In inter-base station CA, a macro cell base station and a small cell base station communicate with a user terminal by using different frequencies.

In conventional LTE and LTE-A systems, the uplink signal transmission power $P_{PUSCH,c}(i)$ of a user terminal per CC can be represented by the following equation 1:

$$P_{PUSCH,c}(i) = \min\{P_{CMAX,c}(i), 10 \log_{10}(M_{PUSCH,c}(i)) + P_{O\_PUSCH,c}(j) + \alpha_c(j) \square PL_c + \Delta_{TF,c}(i) + f_c(i)\}[\text{dBm}] \quad \text{(Equation 1)}$$

Here, $P_{CMAX,c}(i)$ is the maximum transmission power of the user terminal per CC, $M_{PUSCH,c}(i)$ is the number of PUSCH resource blocks, $P_{O\_PUSCH,c}(j)$ is a parameter that relates to transmission power offset and that is reported from the base stations, $\alpha$ is a fractional TPC (Transmission Power Control) slope parameter that is specified by the base stations, $PL_c$ is the propagation loss (path loss), $\Delta_{TF,c}(i)$ is a power offset value based on the modulation scheme and the coding rate, and $f_c(i)$ is a correction value by a TPC command.

The user terminal determines the transmission power based on the above equation 1. When the transmission power reaches the maximum allowable transmission power, the user terminal adjusts the transmission power in accordance with predetermined priority.

The user terminal feeds back a PHR (Power Headroom Report) for reporting the user terminal's remaining transmission power, to the base stations. The PHR is formed with a PH, which represents information about the difference between the user terminal's transmission power $P_{PUSCH}$ and the maximum transmission power $P_{CMAX}$, and a two-bit reserved field.

As represented by the above equation 1, the user terminal's transmission power $P_{PUSCH}$ is configured to be calculated based on the path loss $PL_c$, which is estimated from the downlink. The user terminal feeds back a PHR to the base stations when the fluctuation value of path loss is greater than a predetermined value. When CA is executed, a plurality of component carriers (CCs) are used, and therefore the base stations have no way of knowing the path loss $PL_c$ of CCs apart from the CCs under control.

The user terminal's remaining transmission power $PH_{type1,c}(i)$ can be represented by the following equation 2:

$$PH_{type1,c}(i) = P_{CMAX,c}(i) - \{10 \log_{10}(M_{PUSCH,c}(i)) + P_{O\_PUSCH,c}(j) + \alpha_c(j) \square PL_c + \Delta_{TF,c}(i) + f_c(i)\}[\text{dB}] \quad \text{(Equation 2)}$$

FIG. 3 is a conceptual diagram to explain the user terminal's remaining transmission power PH. As shown in FIG. 3A, when the user terminal's transmission power $P_{PUSCH}$ does not reach the maximum transmission power $P_{CMAX}$, the value given by subtracting the transmission power $P_{PUSCH}$ from the maximum transmission power $P_{CMAX}$ is reported as the value of extra transmission power PH.

As shown in FIG. 3B, when the user terminal's transmission power $P_{PUSCH}$ reaches the maximum transmission power $P_{CMAX}$, the actual transmission power is reported as the value of the maximum transmission power $P_{CMAX}$, and, for the value of surplus transmission power PH, a negative value is reported based on the above equation 2.

When the above-described TPC control and PHR control are applied to inter-base station CoMP/CA, given that MAC schedulers and TPC control are provided separately between the CCs, each base station is unable to know the condition of transmission power in the user terminal completely.

That is to say, the base stations cannot know the values of the number of resource blocks $M_{PUSCH,c}(i)$, the path loss $PL_c$, the power offset value $\Delta_{TF,c}(i)$ based on the modulation scheme and the coding rate and the correction value by a TPC command $f_c(i)$ in the above equation 1, in CCs apart from the CCs under control.

These values are unknown variables to the base stations. Even when a PHR is fed back from the user terminal, the base stations do not know the variables that have been used to calculate the user terminal's remaining transmission power PH with respect to cells operated under other base stations, and therefore cannot estimate the path loss $PL_c$.

FIG. 4 is a conceptual diagram to explain the remaining transmission power PH which the user terminal shown in FIG. 2B feeds back. $PH_1$ in FIG. 4 represents the value of remaining transmission power with respect to the cell operated under the base station 1 in FIG. 2B. $PH_2$ in FIG. 4 represents the value of remaining transmission power with respect to the cell operated under the base station 2 in FIG. 2B.

The present inventors have arrived at, when inter-base station CoMP/CA is employed and the transmission power of a user terminal reaches the subject terminal's maximum transmission power, making the transmission power control value equal to or lower than the upper limit by executing power scaling autonomously.

To be more specific, when a user terminal detects that the subject terminal's transmission power has reached the maximum transmission power, the user terminal executes transmission power control in accordance with predetermined power scaling rules. By this means, it becomes possible to reliably transmit the signals that should be prioritized. Also, it becomes possible to improve the performance of the monitoring of user terminal operations in the network. Note that a user terminal, when calculating transmission power, can detect when the transmission power of the subject terminal reaches the maximum transmission power—that is, when the subject terminal is in a power-limited state.

Now, the power scaling rules provided for execution of transmission power control will be described below in detail.

First Example

A method will be described with a first example whereby a user terminal carries out transmission power control based on physical channel priority rules.

When different physical channels are allocate and the user terminal detects that the subject terminal is in a power-limited state, the user terminal can execute transmission power control based on physical channel priority rules. For example, when the user terminal simultaneously transmits the PUSCH (Physical Uplink Shared Channel) and the PUCCH (Physical Uplink Control Channel), which are signals to transmit on the uplink, the user terminal can allocate power to the PUCCH preferentially.

When identical physical channels are allocated and the user terminal detects that the subject terminal is in a power-limited state, the user terminal can assign priorities depending on the information that is transmitted, and execute transmission power control.

For example, the user terminal can allocate power to a PUSCH that carries control information, with priority over a PUSCH that does not carry control information. Also, the user terminal can preferentially allocate power to a PUSCH where UCI (Uplink Control Information), which is a layer 1 control signal, is multiplexed. Also, the user terminal can preferentially allocate power to a PUSCH that carries control signals (control PDU (Protocol Data Unit)) of the radio link control (RLC) layer or the packet data control protocol (PDCP) layer. Furthermore, the user terminal can preferentially allocate power to a PUSCH that carries RRC messages.

Second Example

A method will be described with a second example whereby a CC where power is to be allocated preferentially is specified or signaled to a user terminal.

When the user terminal detects that the subject terminal is in a power-limited state, the user terminal can preferentially allocate power to a CCs that is specified by a CC index. Alternatively, the user terminal can identify whether the target of power allocation is the PCell's CC or the SCell's CC, and allocate power preferentially. For example, the user terminal may allocate power to the PCell's CC preferentially. In this case, it becomes possible to realize highly reliable communication by prioritizing control information for the PCell.

It is possible to report the order of the priorities of CCs, a single CC or a plurality of CCs to prioritize, or a single CC or a plurality of CCs not to prioritize, to the user terminal. In this case, the user terminal can execute transmission power control based on the signaled CC.

The CC to which power is to be allocated preferentially may be determined on a per physical channel basis. By this means, it may be possible to specify the order of priority depending on the function of the PCell or the SCell. For example, presuming C-plane/U-plane split, a method to prioritize CC #1 with respect to the PUCCH and prioritize CCs #2 and #3 with respect to the PUSCH may be possible.

Instead of the method of specifying or signaling the CC to prioritize, it is also possible to specify or signal the TAG (Timing Advance Group) to prioritize. Generally, base stations in different locations use different TAGs, so that it is likely that changing the priority on a per TAG basis equals determining the priority on a per base station basis.

Third Example

A method will be described with a third example whereby a user terminal switches the cell where power is to be allocated preferentially.

The user terminal can switch the cell where power is to be allocated preferentially—that is, the cell to prioritize for transmission—over time (for example, in TTI (Transmission Time Interval) units).

The user terminal may give equal allocation opportunities to each cell by switching the order of priorities between CCs with equal probability. The probability to prioritize each CC may be specified to the user terminal by, for example, higher layer signaling. By this means, it is possible to realize adequate network operation and control of power allocation opportunity.

The base stations may be structured to be able to configure the CC to prioritize in the user terminal. For example, the base stations may report the CC to prioritize in a UL grant, with an indication of whether the priority is high or low. When a plurality of UL grants have the same priority, for example, the PCell may be prioritized. Also, the base stations may report the CC to prioritize through a higher layer.

Fourth Example

A case will be described with a fourth example whereby a user terminal's maximum transmission power is distributed to each CC when CA is configured.

As for the distribution of the maximum transmission power, a structure may be employed in which the distribution can be configured from the network, or a structure may be may be employed in which the distribution is calculated in accordance with predetermined rules. For example, it is possible to provide rules in advance so that the ratio of distribution assumes even distribution.

For example, when two-CC transmission is carried out and the user terminal's maximum transmission power is 23 [dBm], it is possible to configure the maximum transmission power per CC to 20 [dBm], in equal distribution. However, if such limitation is applied, when the transmission power is quite low or no transmission is carried out in one CC, the maximum transmission power of the other CC is also limited.

By contrast with this, by distributing transmission power only when a user terminal is in a power-limited state, it is possible to avoid limiting transmission power unnecessarily. In this case, power correction may be applied if the user terminal is in a power-limited state and per CC's maximum transmission power limit is exceeded.

When the maximum transmission power per CC is configured, cases might occur where cells with significant path loss cannot be allocated with sufficient resources. To solve this, for example, the volume of distribution may be determined from the perspective of the number of resource blocks, not transmission power.

Others

As shown in FIG. 5, when a plurality of CCs (CC #1 and #2) are allocated to a user terminal, it is possible to preferentially apply power control to CC #1 with the greater transmission power. In this case, looking at the power ratio, it is possible to reduce the decrease of transmission power.

The user terminal can preferentially allocate power to a PUSCH where a greater number of resource blocks are allocated. In this case, it is possible to reduce the consumption of resources when a retransmission occurs.

The user terminal may determine the priority in power allocation based on whether a transmission is a new transmission or a retransmission, or based on the number of retransmissions.

Fifth Example

A method will be described with a fifth example whereby a user terminal sends a report to base stations as to whether or not the subject terminal is in a power-limited state.

As described above, for the base stations, the values of the number of resource blocks $M_{PUSCH,c}(i)$, the path loss $PL_c$, the power offset value $\Delta_{TF,c}(i)$ based on the modulation scheme and the coding rate and the correction value $f_c(i)$ by a TPC command in the above equation 1 are unknown variables.

Among these unknown variables, the values of the path loss $PL_c$ and the power offset value $\Delta_{TF,c}(i)$ based on the modulation scheme and the coding rate are likely to vary little, and in a comparatively moderate manner. Consequently, these variables, even if unknown to the base stations, have little impact on transmission power control.

On the other hand, if the number of resource blocks $M_{PUSCH,c}(i)$ is not known in the base stations, this has a more significant impact on transmission power control. The transmission power of CCs fluctuates significantly depending on the scheduling of other CCs (the number of resource blocks). The condition of power that is learned from existing PHR is too old, and therefore it is necessary to learn the condition of power dynamically, by using other methods.

The user terminal can dynamically report to base stations whether or not the subject terminal is in a power-limited state, by using the PUSCH or the PUCCH. That is, base stations can learn, dynamically, whether or not the user terminal is in a power-limited state.

Whether or not the user terminal is in a power-limited state can be reported, by way of signaling, by adding one bit to the PUSCH or the PUCCH. For example, it is possible to provide that the bit "0" indicates not being in a power-limited state and "1" indicates being in a power-limited state.

Although the above method allows a radio base station to learn whether or not the user terminal is in a power-limited state, the radio base station nevertheless is unable to know whether the reason originates from the subject cell (the subject base station) or originates from other cells (other base stations).

So, in the dynamic signaling by the user terminal, it is possible to add more bits and report the condition of power in the subject cell as well. For example, it is possible to provide that the bits "00" represent that there is not a power-limited state, "01" represents that there is a power-limited state and the subject cell's power occupancy ratio is lower than a reference value, "10" represents that there is a power-limited state and the subject cell's power occupancy ratio is higher than a reference value, and "11" represents "reserved."

That is to say, when the bits "10" are attached, the base stations understand that the transmission power of the subject cell needs to be lowered. The reference value for judging whether the power occupancy ratio in the subject cell is high or low may be specified by RRC or by the MAC layer, or equal distribution may be applied between cells. The power occupancy ratio is not a simple ratio, and it is also possible to report whether or not there is extra remaining power after the minimum required resources are allocated to the other cells.

The user terminal may send out a report that the subject terminal is in a power-limited state by means of a new MAC control signal (MAC control element). When the transmission power exceeds a reference value with respect to a given base station or CC, the user terminal reports the excess and the CC of excess. The reference value of transmission power may be reported via RRC or the MAC layer.

The user terminal may appropriate the current PHR, and, when the transmission power exceeds a reference value, report the excess and the CC of excess. The excess when the transmission power exceeds a reference value means a negative PH, in other words. For example, the user terminal may report the transmission power reference value in the $P_{CMAX,c}$ field, report the excess power in the PH, and report that the PH has a negative value with the reserved bits.

Structure of Radio Communication System

Now, the structure of the radio communication system according to the present embodiment will be described below. In this radio communication system, the above-described radio communication methods according to the first example to the fifth example are employed.

Figure 6:
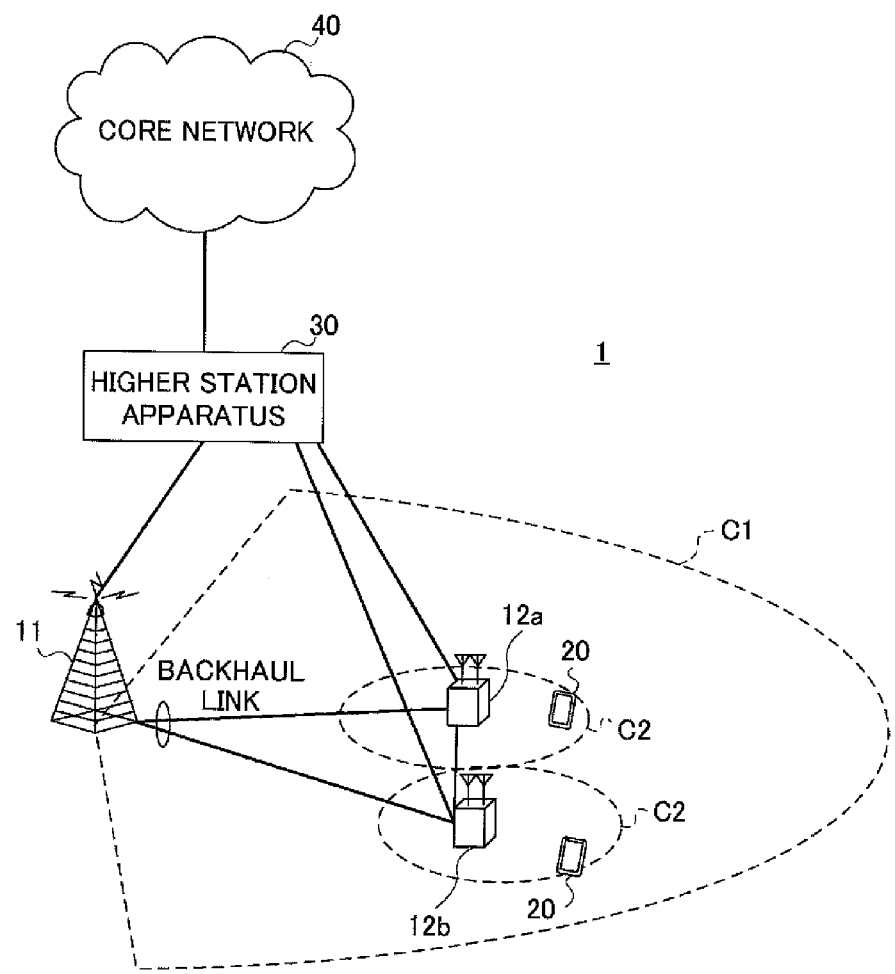
FIG. 6 is a schematic diagram to show an example of a radio communication system according to the present embodiment.

FIG. 6 is a schematic structure diagram to show an example of the radio communication system according to the present embodiment. As shown in FIG. 6, the radio communication system 1 may have a macro base station 11 that forms a macro cell C1, and small base stations 12a and 12b that are placed in the macro cell C1 and that form small cells C2, which are narrower than the macro cell C1. In FIG. 6, the user terminals 20, provided as radio communication terminals, are structured to be capable of carrying out radio communication with at least one of the macro base station 11 and the small base stations 12a and 12b (hereinafter collectively referred to as "small base stations 12"). Note that the number of the macro base station 11 and the small base stations 12 is not limited to that illustrated in FIG. 6.

In the macro cell C1 and the small cells C2, the same frequency band may be used, or different frequency bands may be used. Also, the macro base station 11 and each small base station 12 are connected with each other via an inter-base station interface (for example, optical fiber, the X2 interface, etc.). The macro base station 11 and the small base station 12 are each connected with a higher station apparatus 30, and are connected to a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations having local coverages, and may be referred to as "RRHs (Remote Radio Heads)", "pico base stations", "femto base stations," "HeNBs (Home eNodeBs)," "transmission points," "eNodeBs (eNBs)" and so on. The user terminals 20 are terminals to support various communication schemes such as LTE and LTE-A, and may not only be mobile communication terminals, but may also be stationary communication terminals as well.

The radio communication system 1 presumes the case where the networks that are formed per macro cell are asynchronous (asynchronous operation). Furthermore, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

In the radio communication system 1, a downlink shared channel (PDSCH: Physical Downlink Shared Channel), which is used by each user terminal 20 on a shared basis, a downlink control channel (PDCCH: Physical Downlink Control Channel), an EPDCCH (Enhanced Physical Downlink Control Channel), a PCFICH (Physical Control Format Indicator Channel), a PHICH (Physical Hybrid-ARQ Indicator Channel), a broadcast channel (PBCH: Physical Broadcast Channel) and so on are used as downlink communication channels. User data and higher layer control information are transmitted by the PDSCH. Downlink Control information (DCI) is transmitted using the PDCCH and/or the EPDCCH.

Also, in the radio communication system 1, an uplink shared channel (PUSCH: Physical Uplink Shared Channel), which is used by each user terminal 20 on a shared basis, an uplink control channel (PUCCH: Physical Uplink control Channel) and so on are used as uplink communication channels. User data and higher layer control information are transmitted by the PUSCH. Also, by the PUCCH, downlink radio quality information (CQI: Channel Quality Indicator), delivery acknowledgement information (ACK/NACK) and so on are transmitted.

Hereinafter, the macro base station 11 and the small base stations 12 will be collectively referred to as "radio base station 10," unless specified otherwise.

Figure 7:
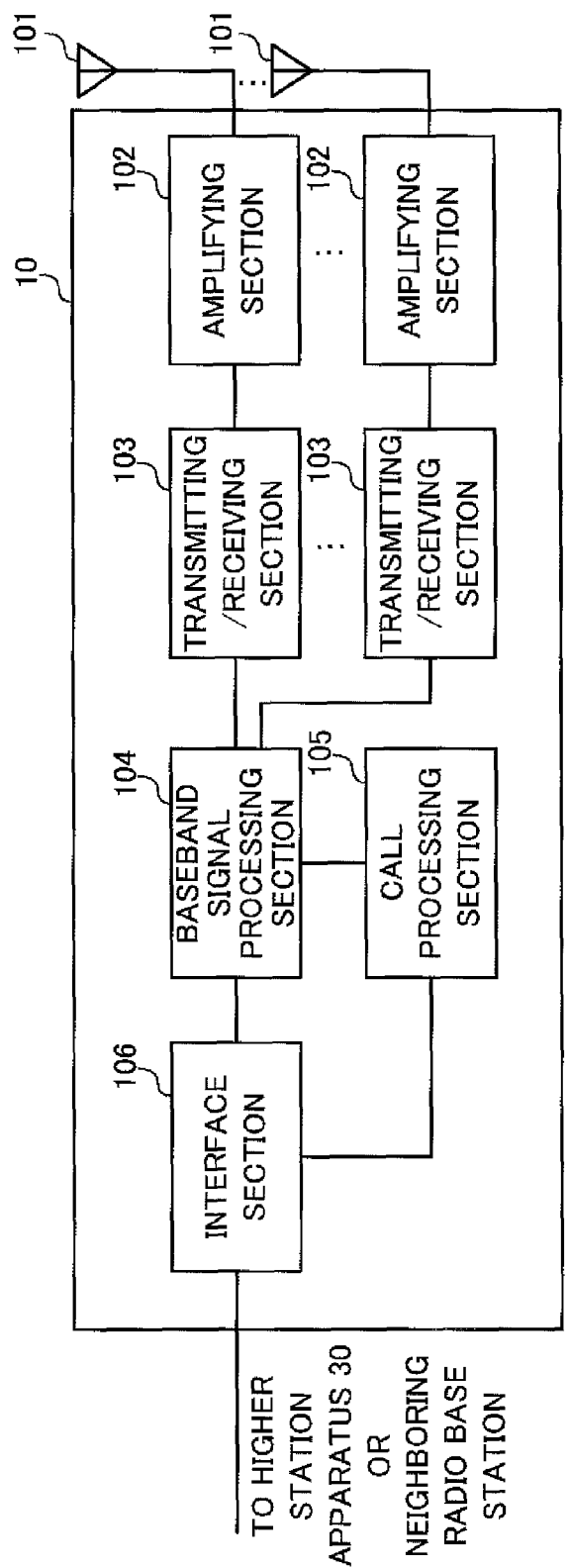
FIG. 7 is a diagram to explain an overall structure of a radio base station according to the present embodiment.

FIG. 7 is a diagram to explain an overall structure of a radio base station 10 according to the present embodiment. The radio base station 10 has a plurality of transmitting/receiving antennas 101 for MIMO transmission, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of user data, RLC (Radio Link control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control signals are also subjected to transmission processes such as channel coding and an inverse fast Fourier transform, and are transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process, and RLC layer and PDCP layer receiving processes, and the result is transferred to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 8:
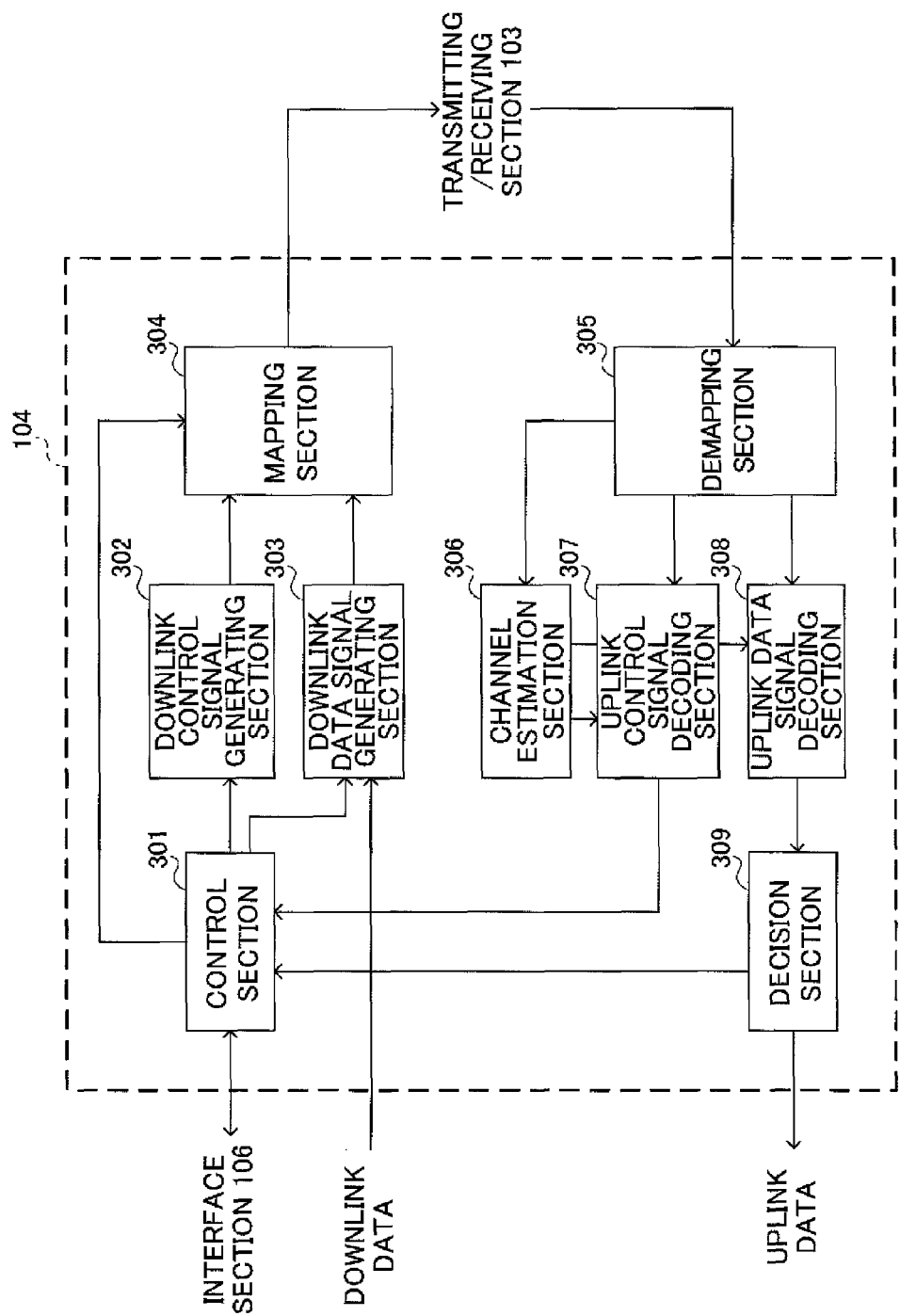
FIG. 8 is a diagram to explain a functional structure of a radio base station according to the present embodiment.

FIG. 8 is a diagram to show a principle functional structure of the baseband signal processing section 104 provided in the radio base station 10 according to the present embodiment. As shown in FIG. 8, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in one or both of the PDCCH and the enhanced PDCCH (EPDCCH), downlink reference signals and so on. Also, the control section 301 also controls the scheduling of RA preambles transmitted in the PRACH, uplink data that is transmitted in the PUSCH, uplink control information that is transmitted in the PUCCH or the PUSCH, and uplink reference signals (allocation control). Information about the allocation control of uplink signals (uplink control signals, uplink user data, etc.) is reported to the user terminal 20 by using a downlink control signal (DCI).

The control section 301 controls the allocation of radio resources to downlink signals and uplink signals based on command information from the higher station apparatus 30, feedback information from each user terminal 20, and so on. That is, the control section 301 functions as a scheduler.

The control section 301 configures the CC to transmit uplink signals to the user terminal 20 preferentially. The control section 301 configures the distribution ratio for distributing the maximum transmission power to each CC, in the user terminal 20.

The downlink control signal generating section 302 generates downlink control signals (which may be both PDCCH signals and EPDCCH signals, or may be one of these) that are determined to be allocated by the control section 301. To be more specific, the downlink control signal generating section 302 generates a DL assignment, which reports downlink signal allocation information, and a UL grant, which reports uplink signal allocation information, based on commands from the control section 301.

The downlink data signal generating section 303 generates downlink data signals (PDSCH signals) that are determined to be allocated to resources by the control section 301. The data signals that are generated in the data signal generating section 303 are subjected to a coding process and a modulation process, based on the coding rates and modulation schemes that are determined based on the CSI from each user terminal 20 and so on.

The mapping section 304 controls the allocation of the downlink control signals generated in the downlink control signal generating section 302 and the downlink data signals generated in the downlink data signal generating section 303 to radio resources based on commands from the control section 301.

The demapping section 305 demaps an uplink signal transmitted from the user terminal 20 and separates the uplink signal. The channel estimation section 306 estimates the channel state from the reference signals included in the received signal separated in the demapping section 305, and outputs the estimated channel state to the uplink control signal decoding section 307 and the uplink data signal decoding section 308.

The uplink control signal decoding section 307 decodes the feedback signals (delivery acknowledgement signals and/or the like) transmitted from the user terminal in the uplink control channel (PRACH, PUCCH, etc.) The uplink data signal decoding section 308 decodes the uplink data signal transmitted from the user terminal in the uplink shared channel (PUSCH), and outputs the result to the decision section 309. The decision section 309 makes a retransmission control decision (A/N decision) based on the decoding result in the uplink data signal decoding section 308, and outputs result to the control section 301.

Figure 9:
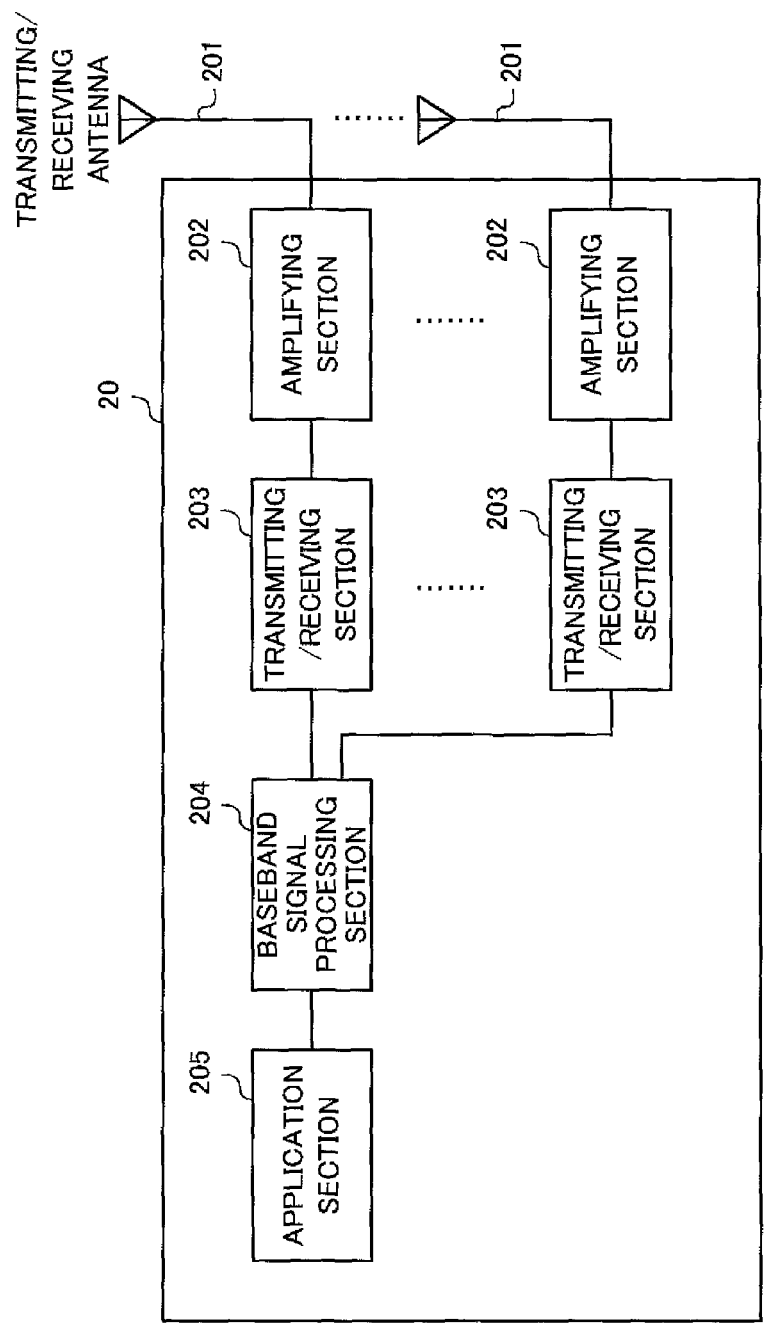
FIG. 9 is a diagram to explain an overall structure of a user terminal according to the present embodiment.

FIG. 9 is a diagram to show an overall structure of the user terminal 20 according to the present embodiment. As shown in FIG. 9, the user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, subjected to frequency conversion in the transmitting/receiving sections 203, and converted into the baseband signal. This baseband signal is subjected to an FFT process, error correction decoding, a retransmission control receiving process and so on in the baseband signal processing section 204. In this downlink data, downlink user data is transferred to the application section 205. The application section 205 performs processes related to higher layers above the physical layer and the MAC layer. Furthermore, in the downlink data, broadcast information is also transferred to the application section 205.

Meanwhile, uplink user data is input from the application section 205 into the baseband signal processing section 204. In the baseband signal processing section 204, a retransmission control (HARQ: Hybrid ARQ) transmission process, channel coding, precoding, a DFT process, an IFFT process and so on are performed, and the result is transferred to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the result from the transmitting/receiving antennas 201.

Figure 10:
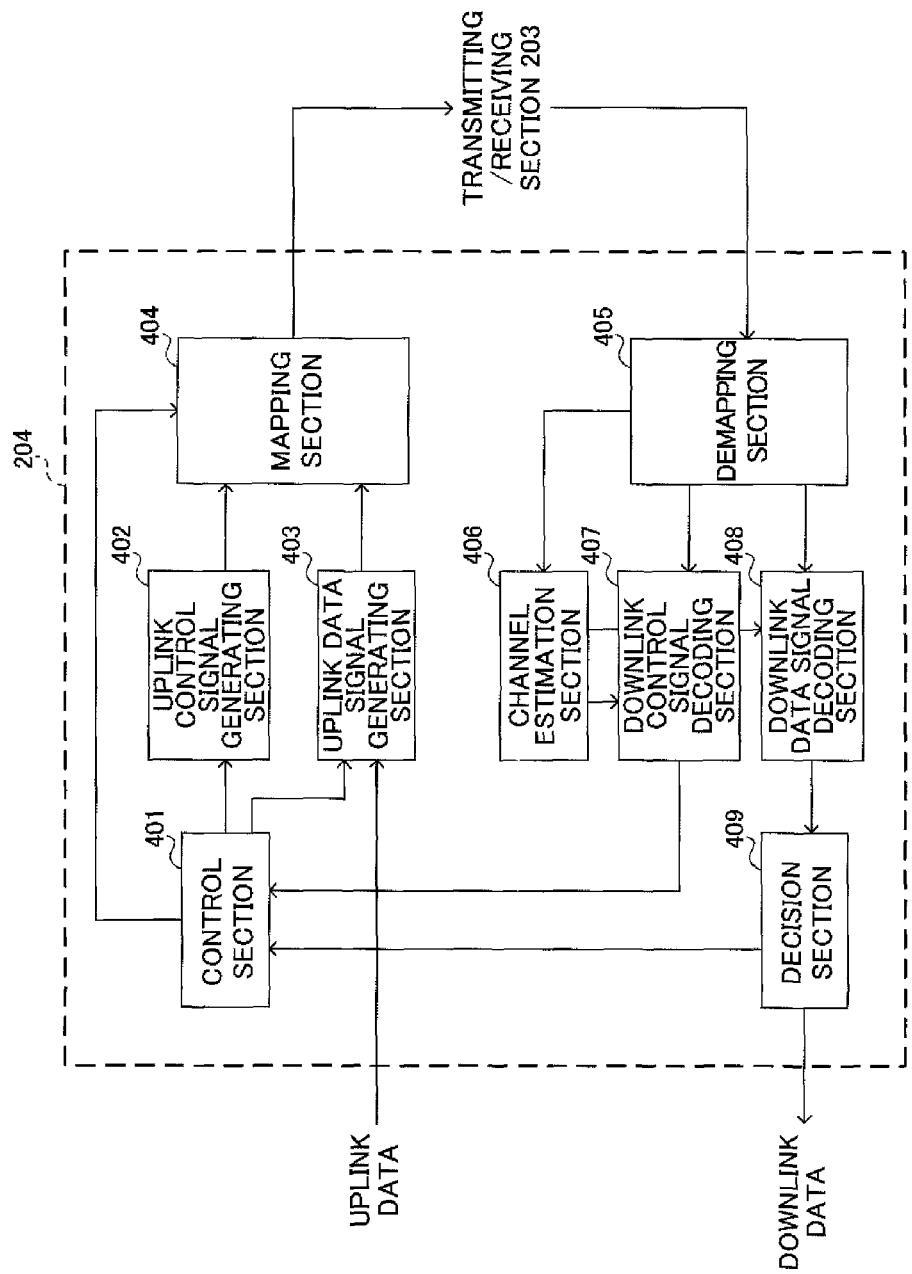
FIG. 10 is a diagram to explain a functional structure of a user terminal according to the present embodiment.

FIG. 10 is a diagram to show a principle functional structure of the baseband signal processing section 204 provided in the user terminal 20. As shown in FIG. 10, the baseband signal processing section 204 provided in the user terminal 20 is comprised at least of a control section 401, an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (A/N signals, etc.), uplink data signals and so on based on downlink control signals (PDCCH signals) transmitted from the radio base station, retransmission control decisions in response to the PDSCH signals received, and so on. The downlink control signals received from the radio base station are output from the downlink control signal decoding section 407, and the retransmission control decision is output from the decision section 409.

The control section 401 executes control so that the CC to transmit uplink physical channel preferentially is switched over time. The control section 401 executes control so that the subject terminal's maximum transmission power is distributed to each CC and the transmission power for each CC is corrected.

The uplink control signal generating section 402 generates uplink control signals (feedback signals such as delivery acknowledgement signals, channel state information (CSI) and so on) based on commands from the control section 401. The uplink data signal generating section 403 generates uplink data signals based on commands from the control section 401. Note that, when an uplink grant is contained in a downlink control signal reported from the radio base station, the control section 401 commands the uplink data signal 403 to generate an uplink data signal.

The mapping section 404 controls the allocation of the uplink control signals (delivery acknowledgment signals and so on) and the uplink data signals to radio resources (PUCCH, PUSCH, etc.) based on commands from the control section 401.

The demapping section 406 demaps a downlink signal transmitted from the radio base station 10 and separates the downlink signal. The channel estimation section 407 estimates the channel state from the reference signals included in the received signal separated in the demapping section 406, and outputs the estimated channel state to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information regarding the allocation to uplink resources) to the control section 401. Also, when the downlink control signal includes information related to the cells where delivery acknowledgement signals are fed back, information as to whether or not to apply RF adjustment and so on, these pieces of information are also output to the control section 401.

The downlink data signal decoding section 408 decodes the downlink data signal transmitted in the downlink shared channel (PDSCH), and outputs the result to the decision section 409. The decision section 409 makes a retransmission control decision (A/N decision) based on the decoding result in the downlink data signal decoding section 408, and outputs the result to the control section 401.

The present invention is by no means limited to the above embodiment and can be implemented in various modifications. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2013-200401, filed on Sep. 26, 2013, including the specification, drawings and abstract, is incorporated herein by reference in its entirety.

The invention claimed is:

1. A user terminal that communicates with a plurality of radio base stations, the user terminal comprising:
   a transmission section that transmits uplink signals to each of the plurality of radio base stations; and
   a control section that, when a transmission power of the uplink signals that are allocated to be simultaneously transmitted to the plurality of radio base stations reaches a maximum allowable transmission power, corrects the transmission power of at least one of the uplink signals based on a distribution ratio of the maximum allowable transmission power determined by at least one of the plurality of radio base stations.

2. The user terminal according to claim 1, wherein when the transmission power of the uplink signals allocated to be transmitted to the plurality of radio base stations simultaneously reaches the maximum allowable transmission power and when a transmission power of uplink signals allocated to be transmitted in a component carrier exceeds maximum transmission power of the component carrier calculated based on the distribution ratio, the control section corrects the transmission power of the uplink signals allocated to the component carrier.

3. The user terminal according to claim 2, wherein, when the transmission power of the uplink signals allocated to be transmitted to the plurality of radio base stations simultaneously reaches the maximum allowable transmission power and when a transmission power of uplink signals allocated to be transmitted in the component carrier does not exceed maximum transmission power of the component carrier calculated based on the distribution ratio, the control section does not correct the transmission power of the uplink signals allocated to the component carrier.

4. The user terminal according to claim 1, wherein the distribution ratio of the maximum allowable transmission power is determined per component carrier of the radio base station.

5. The user terminal according to claim 4, wherein when one component carrier is configured per radio base station for the plurality of radio base stations, the distribution ratio of the maximum allowable transmission power is determined per radio base station.

6. The user terminal according to claim 1, wherein the maximum allowable transmission power is $P_{CMAX}$.

7. The user terminal according to claim 1, wherein the control section evenly distributes the maximum allowable transmission power to each component carrier of the radio base stations based on the distribution ratio.

8. A radio base station included in a plurality of radio base stations that communicates with a user terminal, the radio base station comprising:
   a control section that determines a distribution ratio of a maximum allowable transmission power of the user terminal; and
   a transmission section that transmits the distribution ratio of the maximum allowable transmission power to the user terminal;
   wherein the distribution ratio is used in the user terminal to correct transmission power of at least one uplink signal among a plurality of uplink signals that are allocated to be simultaneously transmitted to the radio base station and the plurality of other radio base stations when transmission power of the plurality of uplink signals reaches the maximum allowable transmission power.

9. A radio communication method for a user terminal that communicates with a plurality of radio base stations, the radio communication method comprising the steps of:
   transmitting uplink signals to each of the plurality of radio base stations; and
   wherein a transmission power of the uplink signals that are allocated to be simultaneously transmitted to the plurality of radio base stations reaches a maximum allowable transmission power, corrects the transmission power of at least one of the uplink signals based on a distribution ratio of the maximum allowable transmission power determined by at least one of the plurality of radio base stations.

* * * * *

UNITED STATES PATENT AND TRADEMARK OFFICE
CERTIFICATE OF CORRECTION

PATENT NO. : 9,936,465 B2  
APPLICATION NO. : 15/024883  
DATED : April 3, 2018  
INVENTOR(S) : Kakishima et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 67 days.

Signed and Sealed this  
Fifth Day of February, 2019

Andrei Iancu  
*Director of the United States Patent and Trademark Office*